(12) United States Patent
Kimura et al.

(10) Patent No.: US 6,621,982 B1
(45) Date of Patent: Sep. 16, 2003

(54) ERROR CORRECTION APPARATUS AND DISK PLAYER USING THE SAME

(75) Inventors: Satoru Kimura, Kanagawa (JP); Kazuhiro Yasuda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/313,381

(22) Filed: May 18, 1999

(30) Foreign Application Priority Data

May 19, 1998 (JP) .......................................... P10-136997

(51) Int. Cl.[7] .............................................. H04N 5/781
(52) U.S. Cl. .................................... 386/116; 386/125
(58) Field of Search .......................... 386/22, 113, 116, 386/45, 125, 126, 124; 360/32, 48, 53; 714/51, 52, 751, 755, 756, 752, 758, 761, 762, 763, 764, 769, 770, 785, 787, 788, 800, 766; H04N 5/76, 5/92, 5/79, 5/781

(56) References Cited

U.S. PATENT DOCUMENTS 5,546,409 A * 8/1996 Karasawa .................. 371/37.4
6,401,228 B1 * 6/2002 Ichikawa et al. ........... 714/755
6,430,723 B2 * 8/2002 Kodama et al. ............ 714/770

* cited by examiner

Primary Examiner—Thai Tran
(74) Attorney, Agent, or Firm—Rader, Fishman & Grauer PLLC; Ronald P. Kananen, Esq.

(57) ABSTRACT

An error correction apparatus comprises a buffer memory for successively storing ECC error correction blocks included in the reproducing signal read from the optical disk in units of a row including a corresponding inner code parity, and an error correction means for successively performing an error correction on the read row by reading the column of information data stored in a buffer memory and said inner code parity corresponding to the column from among the ECC error correction block and using the read inner code parity in parallel with processing for storing the remaining data forming the ECC error correction block at a timing before all of data constituting the ECC error correction block is stored in the buffer memory.

14 Claims, 5 Drawing Sheets

ERROR CORRECTION APPARATUS AND DISK PLAYER USING THE SAME

BACKGROUND OF THE INVENTION

1. Field of the Invention

The present invention relates to an error correction apparatus and an optical disk player using the same.

2. Description of the Related Art

In a digital versatile disk (DVD) player and the like, an analog signal read from the DVD is converted to a digital signal and the digital signal is subjected to an 8-16 conversion when reproducing a DVD. A single error correcting codes (ECC) block worth of digital signal obtained by the 8-16 conversion is stored in a buffer memory, an error correction is performed by reading the signal, and the error corrected digital signal is decoded.

The error correction is performed on the digital signal read from the DVD in units of the ECC.

FIG. 1 is a view for explaining the format of the ECC block.

Data $B_{M,N}$ ($0 \leq M \leq 191$, $0 \leq N \leq 171$) shown in FIG. 1 is information data composed of 16 sectors each having 172 bytes 12 rows.

Also, data $B_{M,N}$ ($0 \leq M \leq 207$, $172 \leq N \leq 181$) is an inner code parity of a Read-Solomon code.

Namely, the inner code parity ($172 \leq N \leq 181$) is an inner code parity of the information data $B_{M,N}$ ($0 \leq N \leq 171$).

Also, the data $B_{M,N}$ ($192 \leq M \leq 207$, $0 \leq N \leq 171$) is an outer code parity of the Read-Solomon code.

Namely, the outer code parity $B_{M,N}$ ($192 \leq M \leq 207$) is an outer code parity of the information data $B_{M,N}$ ($0 \leq M \leq 192$).

Below, execution timing of processing for storing the ECC block worth of digital signal in the buffer memory and the processing for the error correction will be explained.

FIG. 2 is a view for explaining an execution timing of processing for storing one ECC block worth of the digital signal and an error correction.

In FIG. 2, the abscissa axis indicates time and the ordinates axis indicates a data amount.

As shown in FIG. 2, the one ECC block worth of digital signal is written in the buffer memory between the time "0" and "t1". Next, the one ECC block worth of digital signal written during the time between "0" and "t1" is read and the error correction is performed between the time "t1" and "t2". Also, the next one ECC block worth of the digital signal is written in the buffer memory during the time "t1" and "t2". Next, the one ECC block worth of digital signal written in the buffer memory between the time "t1" and "t3" is read and the error correction is performed between the time "t3" and "t4".

In this way, in the DVD player of the related art, one ECC block worth of digital signal is first stored in the buffer memory, and the error correction is performed by reading the digital signal from the buffer memory. Therefore, at least the time for "t2" is required from the start of the writing to the buffer memory to the completion of the error correction.

Namely, the time from the start of writing the ECC block to the buffer memory to the completion of the error correction affects the access time or reproducing time of the DVD player.

Recently, there is a demand for a shorter accessing time or reproducing time of the DVD player, so it has been desired that the time from the start of writing the ECC block to the buffer memory to the completion of the error correction be shortened.

SUMMARY OF THE INVENTION

An object of the present invention is to provide an error correction apparatus and an optical disk reproducing apparatus which can shorten the access time of a DVD player by shortening the time from the start of writing the ECC block to a buffer memory to the completion of an error correction.

To attain the above object, the error correction apparatus of the present invention performs an error correction in units of an error correction code block composed of information data, an inner code parity indicating the error correction code for every row of the information data and an outer code parity indicating an error correction code for every column of the information data when a plurality of bit data forming the information data is arranged in matrix, and comprises: a memory means for storing the error correction code block included in a signal read from a memory medium by inputting the error correction code block as units of the row of the information data and the inner code parity corresponding to the row; and an error correction means for reading the row of the information data and the inner code parity corresponding to the row among the error correction code block stored in the memory means and performing an error correction of the read row of the information data by using the read inner code parity data at the timing before all of the data constituting the error correction code block has been stored in the memory means, in parallel with the operation of storing in the memory means the remaining data constituting the error correction code block.

In the error correction apparatus of the present invention, the error correction code block included in the reproducing signal read from the recording medium is successively stored in the memory means in units of a row including the corresponding inner code parity.

Then, in parallel with the storing processing, the row of the information data already stored in the memory means and the inner code parity corresponding to the row from among the error correction code block during being stored in the memory means are successively read, and an error correction of the read row is carried out by using the read inner code parity at the timing before all of the data constituting the error correction code block is stored in the memory means in the error correction means.

Preferably, in the error correction apparatus of the present invention, the error correction means terminates the operation of the error correction using the inner code parity on the error correction code block at the timing approximately matching to a timing when all of the data constituting the error correction code block data is stored in the memory means.

Preferably, in the error correction apparatus of the present invention, the error correction means starts the operation of the error correction at the timing after a first row of the information data and the inner code parity corresponding to the first row is stored in the memory means.

Preferably, in the optical disc reproduction apparatus of the present invention, the error correction means terminates the operation of the error correction using the inner code parity on the error correction code block at the timing approximately matching to a timing when all of the data constituting the error correction code block data is stored in the memory means.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, a DVD player according to preferred embodiments of the present invention will be described with reference to the accompanying drawings.

Figure 3:
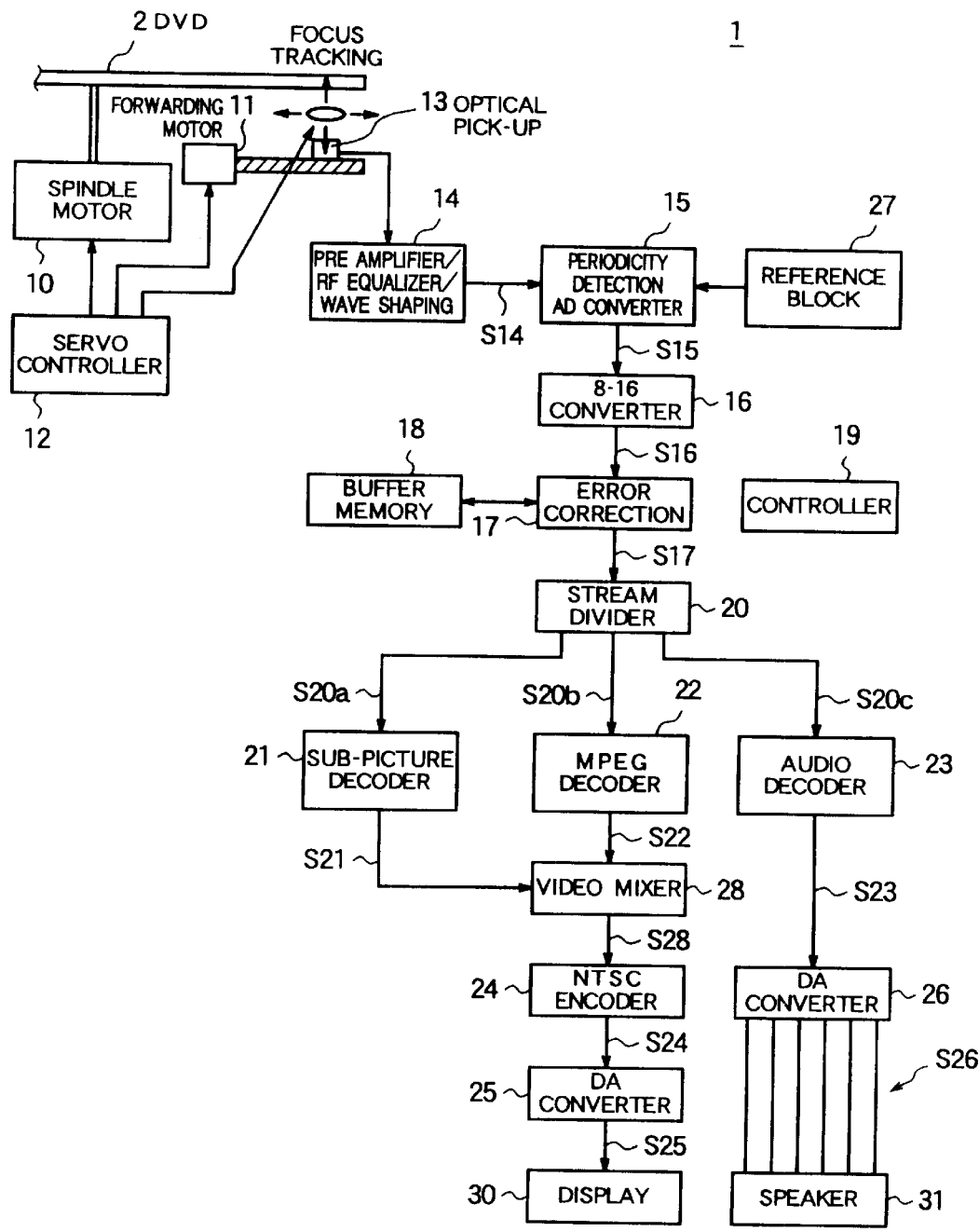
FIG. 3 is a view of the configuration of a DVD player according to an embodiment of the present invention.

FIG. 3 is a view of the configuration of a DVD player 1 of the present invention.

As shown in FIG. 3, the DVD player 1 comprises a spindle motor 10, a forwarding motor 11, a servo controller 12, an optical pick-up 13 as a reading means, a wave shaping unit 14, an analog/digital (AD) converter 15, an 8-16 converter 16, an error correction unit 17 as an error correction means, a buffer memory 18 as a memory means, a controller 19, a stream divider 20, a sub-picture decoder 21, a moving picture experts group (MPEG) decoder 22 as a decoding means, an audio decoder 23, a national television system committee (NTSC) encoder 24, digital/analog (DA) converters 25 and 26, a reference clock generator 27 and a video mixer 28.

The servo controller 12 controls the position of an objective lens of the optical pick-up 13 as well as the spindle motor 10 and the forwarding motor 11.

The spindle motor 10 drives the rotation of a DVD 2 based on a control from the servo controller 12.

The forwarding motor 11 drives the movement of the optical pick-up 13 in the diameter direction of the DVD 2 based on a control from the servo controller 12.

The optical pick-up 13 emits a laser light on the surface of the DVD 2 via an objective lens, receives the reflected light and outputs a reproducing signal in accordance with the results of the light reception to the wave shaping unit 14.

The wave shaping unit 14 carries out a wave shaping of the reproducing signal from the optical pick-up 13 and outputs the same as a reproducing signal S14 to the AD converter 15.

The AD converter 15 converts the reproducing signal S15 in an analog mode to a reproducing signal S15 in a digital mode and outputs the same to the 8-16 converter 16.

The 8-16 converter 16 generates a reproducing signal S17 by converting an 8-bit pattern included in the reproducing signal S15 to a 16-bit pattern and outputs the same to the error correction unit 17.

The buffer memory 18 has a memory capacity for storing at least an ECC block worth of the reproducing signal S16 as a single error correction code block from the 8-16 converter 16 based on a control from the controller 19, and outputs the stored reproducing signal to the error correction unit 17.

Figure 1:
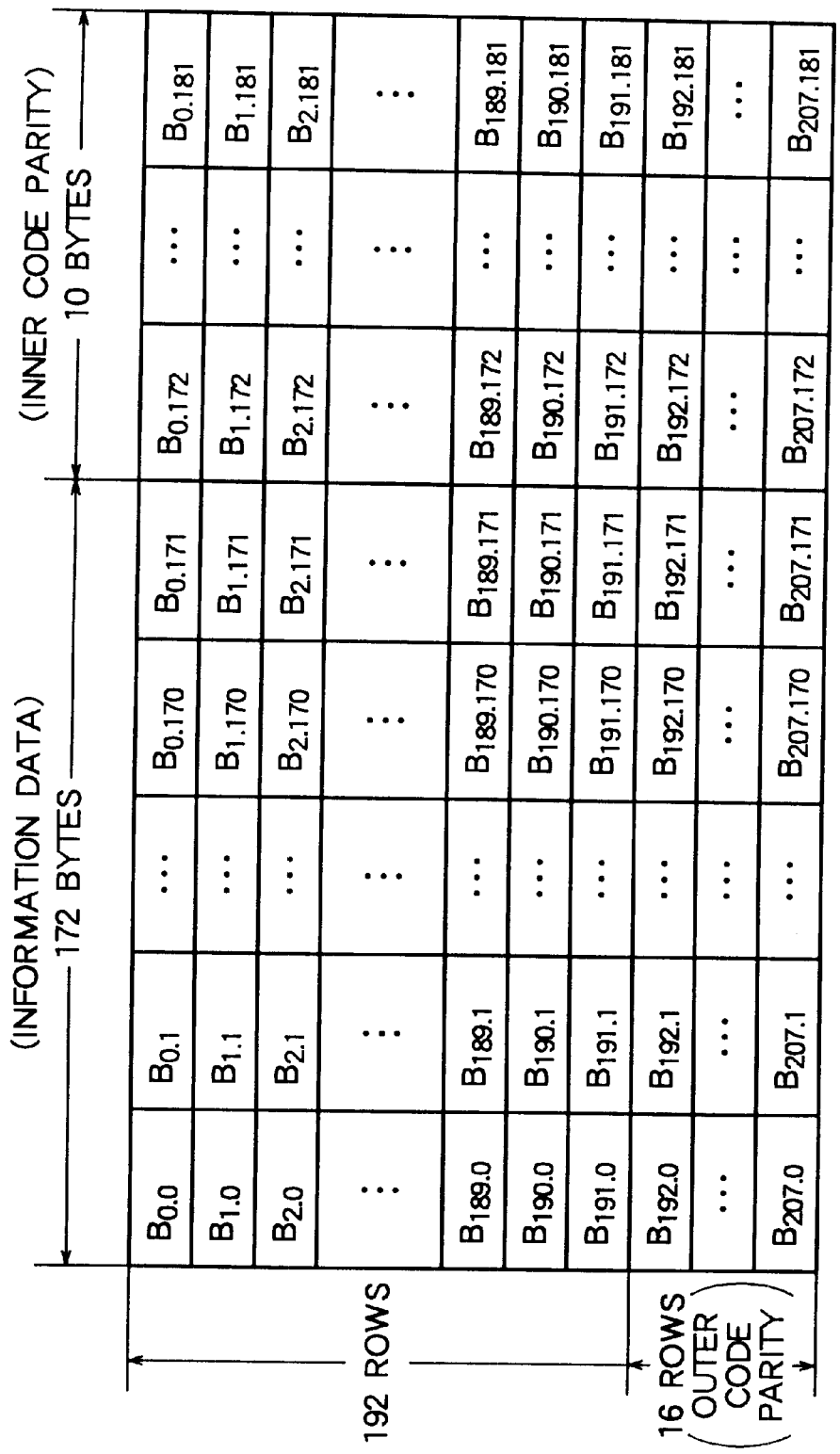
FIG. 1 is a view for explaining the format of one ECC block worth of a digital signal read from a DVD.

The error correction unit 17 performs an inner code error correction and an outer code error correction of the reproducing signal read from the buffer memory 18 in units of one block shown in FIG. 1, and outputs the reproducing signal S17 after being subjected to the correction to the stream divider 20. As error correction code, for example, a Reed Solomon code is used.

Processing in the error correction unit 17 and the buffer memory 18 will be explained in detail later on.

The reproducing signal S17 is a data stream at the time of pre-mastering.

The stream divider 20 divides a sub-picture signal S20a, a video signal S20b and an audio signal S20c from the reproducing signal S17 and outputs the same respectively to the sub-picture decoder 21, the MPEG decoder 22 and the audio decoder 23.

The sub-picture decoder 21 decodes the sub-picture signal S20a and outputs the decoded sub-picture signal S21 to the video mixer 28.

The MPEG decoder 22 decodes the video signal S20b in an MPEG format and outputs the decoded video signal S22 to the video mixer 28.

The audio decoder 23 decodes the audio signal S20c and outputs the decoded audio signal S23 to the DA converter 26.

The DA converter 26 converts the audio signal S23 in an analog mode to an audio signal S26 in a digital mode and outputs the same to a speaker 31.

The video mixer 28 combines the video signal S22 and the sub-picture signal S21 to generate a video signal S28 and outputs the same to the NTSC encoder 24.

The NTSC encoder 24 decodes the video signal S28 in an NTSC format and outputs the decoded video signal S24 to the DA converter 25.

The DA converter 25 converts the video signal S24 to a video signal S25 in an analog mode and outputs the same to a display 30.

Below, processing of the error correction unit 17 and the buffer memory 18 by a control of the controller 19 will be explained in detail.

Figure 4:
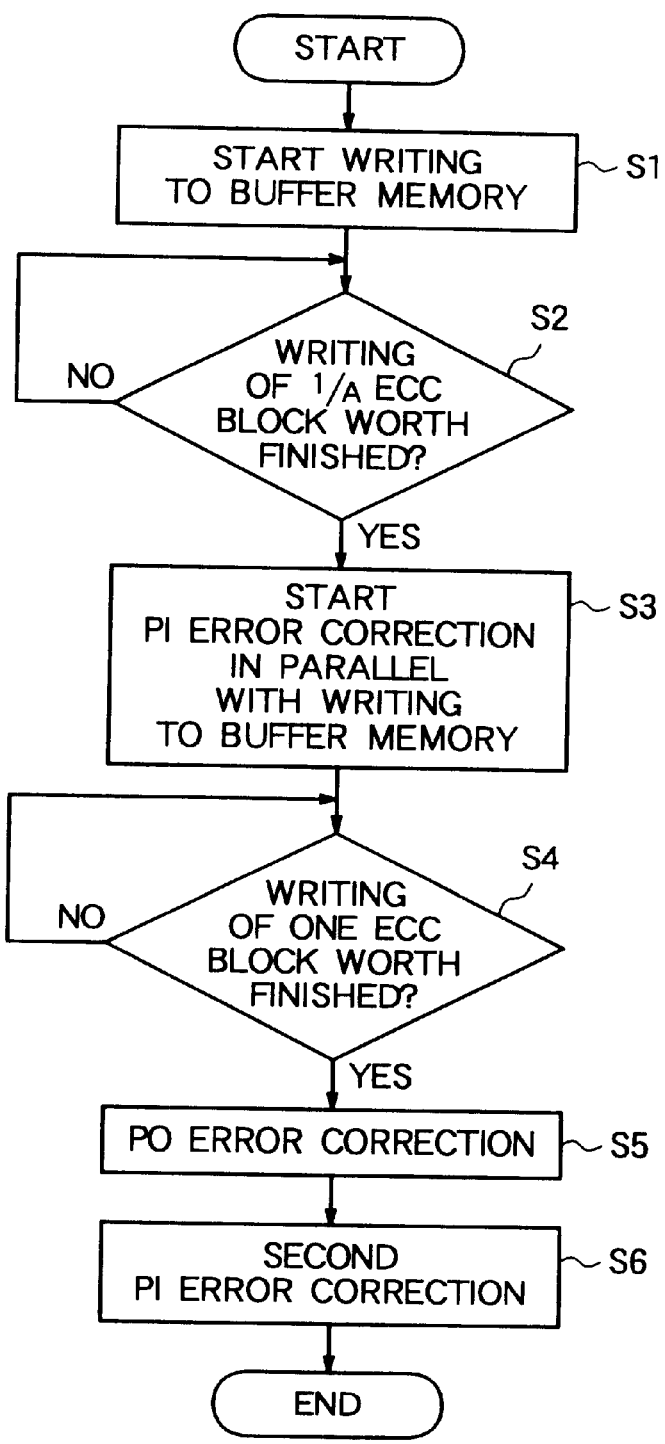
FIG. 4 is a flow chart for explaining processing of an error correction apparatus and the buffer memory by control of the controller shown in FIG. 3.

FIG. 4 is a flow chart for explaining the processing of the error correction unit 17 and the buffer memory 18 by control from the controller 19.

Step S1: The controller 19 shown in FIG. 3 controls the 8-16 converter 16 and the buffer memory 18 and starts writing one ECC block worth of reproducing signal S16 from the 8-16 converter 16 to the buffer memory 18.

The writing of the reproducing signal S16 from the 8-16 converter 16 to the buffer memory 18 is carried out in units of the ECC block shown in FIG. 1. First, data $B_{0,0}$ to $B_{0,181}$, shown in FIG. 1 is written, then, data $B_{1,0}$ to $B_{1,181}$ is written. Subsequently, data $B_{2,0}$ to $B_{2,181}$, data $B_{3,0}$ to $B_{3,181}$, ..., data $B_{11,0}$ to $B_{11,181}$, data $B_{192,0}$ to $B_{192,181}$ is written.

Then, the writing operation is carried out in the same pattern to write data $B_{168,0}$ to $B_{168,181}$, ... $B_{179,0}$ to $B_{179,181}$, $B_{206,0}$ to $B_{206,181}$, $B_{180,0}$ to $B_{180,181}$, ..., $B_{191,0}$ to $B_{191,181}$, data $B_{207,0}$ to $B_{207,181}$, and the writing operation of one ECC block worth of data completes.

Here, one frame is composed of data $BH_{M,0}$ to $B_{M,171}$ and one sector is composed of 13 frames. Further, one ECC block is composed of 16 sectors.

Step S2: The controller 19 judges whether or not the "1/A" times of one ECC block worth of reproducing signal S16 is written in the buffer memory 18. When judged it is not written, the controller 19 repeats the judgement operation until it is judged to be written, then performs the processing in Step S3.

Figure 5:
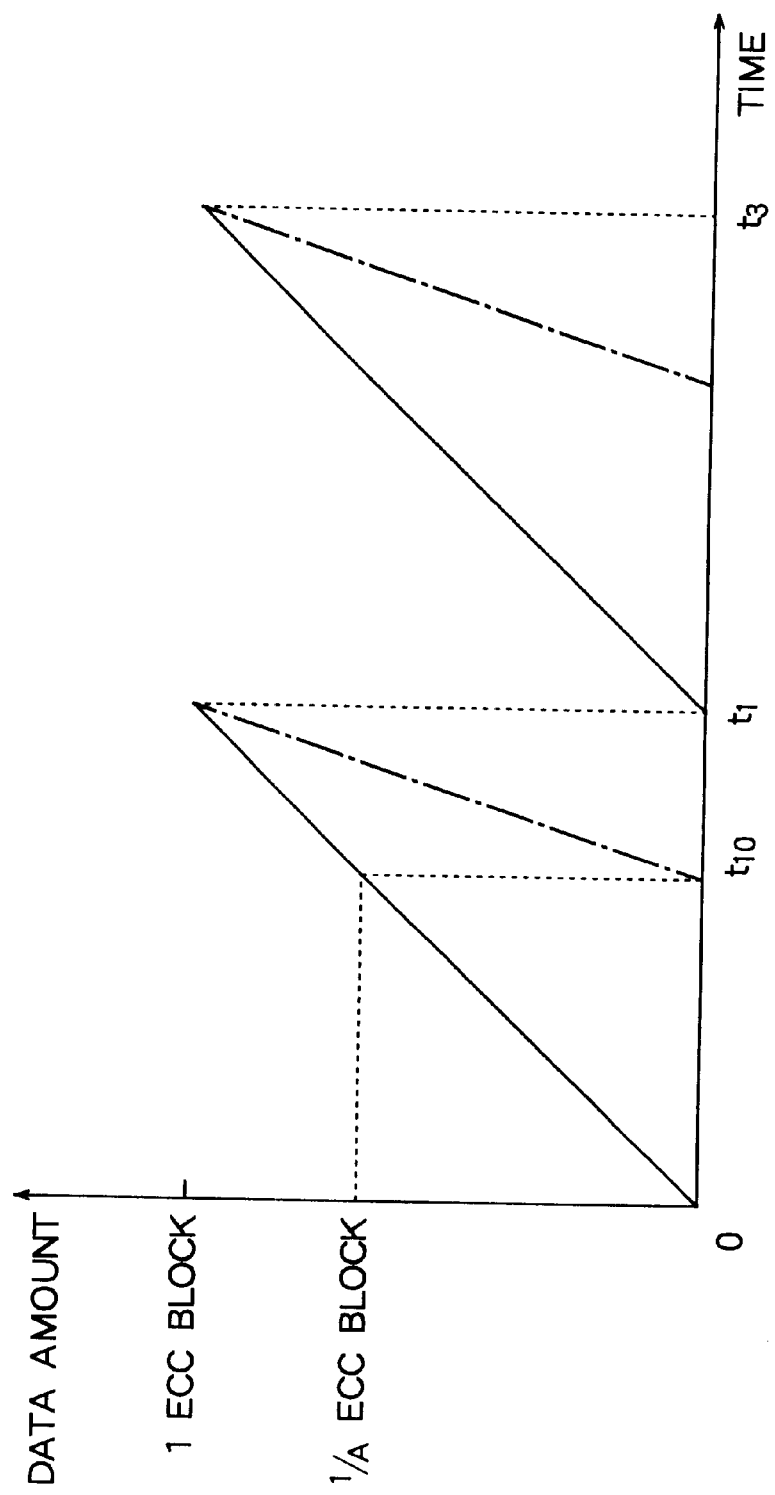
FIG. 5 is a view for explaining an execution timing of processing for storing one ECC block worth of the digital signal and an error correction in the DVD player shown in FIG. 3.

Here, as shown in FIG. 5, "A" is decided so that the correction of the inner code error will be finished at the timing when one ECC block worth of reproducing signal S16 is finished to be written from the 8-16 converter 16 to the error correction unit 17. Namely, at the time "t10" shown in FIG. 5, the "1/A" times of one ECC block worth of the reproducing signal S16 is written to the buffer memory 18, and the error correction unit 17 starts the correction of the inner code error.

Step S3: When "1/A" times of one ECC block worth of reproducing signal S16 is written to the buffer memory 18, the controller 19 reads the reproducing signal from the buffer memory 18 to the error correction unit 17 in a written order in parallel with the writing processing, and performs a first correction of the inner codes error on the read reproducing signal. The result of the correction of the inner code error is written back to the buffer memory 18. At this time, the correction of the inner code error is performed in units of a sector.

Specifically, the data $B_{0,0}$ to $B_{0,181}$ shown in FIG. 1 is read, then the data $B_{1,0}$ to $B_{1,181}$ is read. Then, one ECC block worth of data is read in an order of data $B_{2,0}$ to $B_{2,181}$, data $B_{3,0}$ to $B_{3,181}$ ..., data $B_{207,0}$ to $B_{207,181}$, from the buffer memory 18 to the error correction unit 17 first Step S4: The controller 19 judges whether or not the writing of one ECC block worth of reproducing signal S16 to the buffer memory 18 is finished. When it is judged it is finished, the controller 19 stops the processing, while it is not, the controller 19 repeats the judgement.

Here, since the "A" in Step S2 is defined as above, at the time "t1" when the writing of one ECC block worth of reproducing signal S16 to the buffer memory 18 is finished, the first correction of the inner code error by the error correction unit 17 is also finished, as shown in FIG. 5.

Step S5: The controller 19 performs the correction of an outer code error by reading the result of the first correction of the inner code error from the buffer memory 18 to the error correction unit 17, and writes back the result of correction of the outer code error to the buffer memory 18.

At this time, the correction of the outer code error is performed for every column shown in FIG. 1. Namely, the correction of the outer code error correction is performed in units of data $B_{0,M}$ to $B_{207,M}$.

Step S6: The controller 19 reads the result of the correction of the outer code error from the buffer memory 18 to the error correction unit 17 to perform a second error correction and outputs the result of the second correction to the stream divider 20 as a reproducing signal S17.

Next, the entire operation of the DVD player 1 will be explained with reference to FIG. 3.

First, the DVD 2 rotates by the rotation drive from the spindle motor 10 based on the control of the servo controller 12, and a reproducing signal is output from the optical pick-up 13 to the wave shaping unit 14. The reproducing signal is subjected to a wave shaping in the wave shaping unit 14, and the wave shaped reproducing signal S14 is output to the AD converter 15.

The reproducing signal S14 is converted to a reproducing signal S15 in a digital mode in the AD converter 15 and output as a reproducing signal S15 to the 8-16 converter 16.

The reproducing signal S15 is subjected to the 8-16 conversion in the 8-16 converter 16. Then, the converted reproducing signal S16 is stored in the buffer memory 18 as explained above, and subjected to the error correction in the error correction unit 17 in the units of the ECC block.

Then, in the error correction unit 17, the error corrected reproducing signal S17 is output to the stream divider 20, which divides the same into the sub-picture signal S20a, the video signal S20b and the audio signal S20c and outputs respectively to the sub-picture decoder 21, the MPEG decoder 22 and the audio decoder 23.

Next, the sub-picture signal S20a is decoded in the sub-picture decoder 21 and the decoded sub-picture signal S21 is output to the video mixer 28.

The video signal S20b is decoded in the MPEG decoder 22 and the decoded video signal S22 is output to the video mixer 28.

Also, the audio signal S20c is decoded in the audio decoder 23 and the decoded audio signal S23 is output to the DA converter 26.

The sub-picture signal S20a is combined with the video signal S22 in the video mixer 28, and the video signal S28 as the combined result is output to the NTSC encoder 24.

Then, the video signal S28 is subjected to an NTSC decoding in the NTSC encoder 24, and a video signal S24 as the decoded result is output to the DA converter 25.

The video signal S24 is converted to a video signal S25 in an analog mode in the DA converter 25 and the video signal S25 is output to the display 30.

Also, the audio signal S23 is converted to an audio signal S26 in an analog mode in the DA converter 26 and the audio signal S26 is output to the speaker 31.

Figure 2:
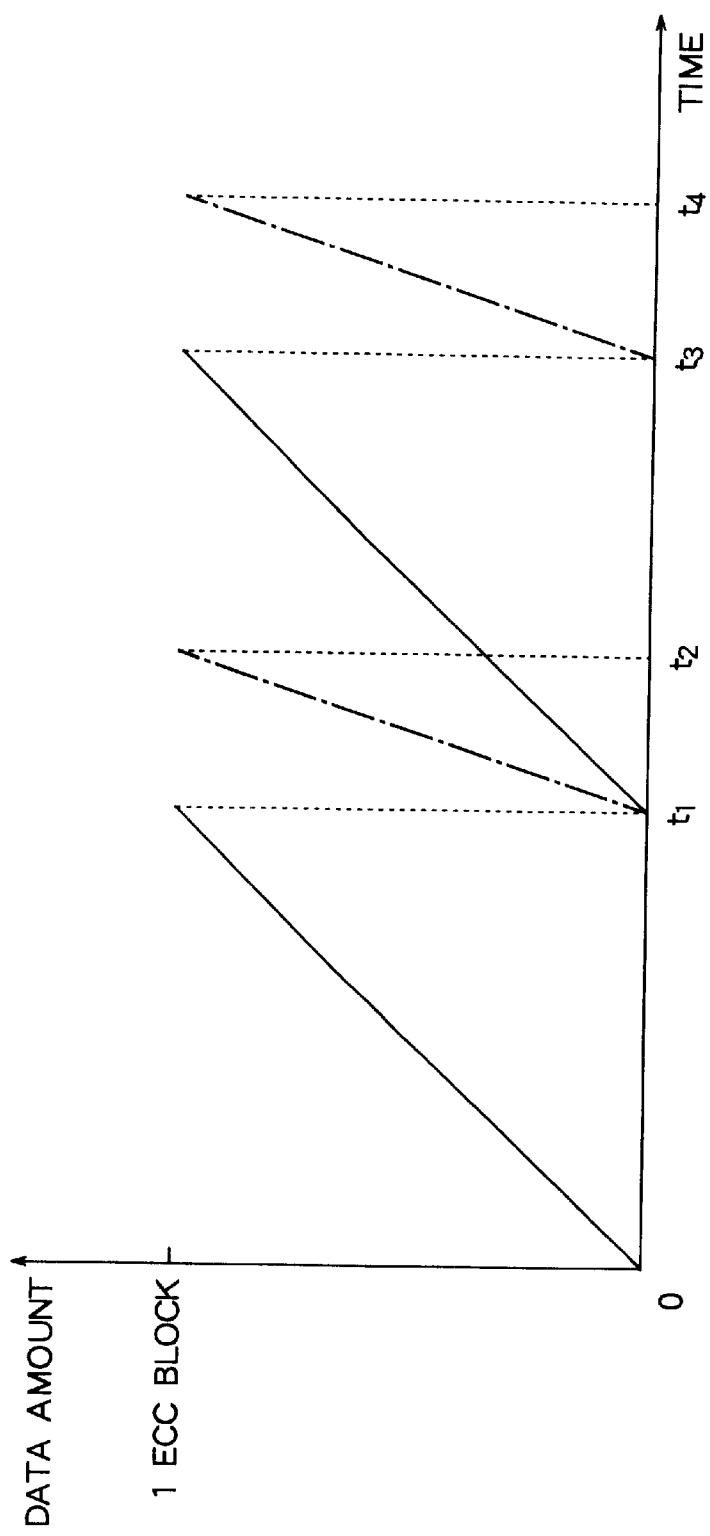
FIG. 2 is a view for explaining an execution timing of processing for storing one ECC block worth of the digital signal and an error correction.

As explained above, according to the DVD player of the present embodiment, as shown in FIG. 5, the first correction of the inner code error by the error correction unit 17 starts at the timing "t10" which is the timing when the "1/A" times of one ECC block worth of the reproducing signal S16 is written from the 8-16 converter 16 to the buffer memory 18. Therefore, as shown in FIG. 5, the first correction of the inner code error can be finished at the timing of "t1" when one ECC block worth of reproducing signal S16 is written from the 8-16 converter 16 to the buffer memory 18. Accordingly, comparing with the case of the related art shown in FIG. 2, the timing to finish the first correction of the inner code error can be shortened by the length of "t2". As a result, the access time, reproducing time, of the DVD player can be made shorter.

Note, for example, when a DRAM is used as a buffer memory 18, an 8-page mode word accessing is performed and at a single-speed, the first correction of the inner code error starts at the time of finishing writing the "15 sectors plus 15 frames" worth of signals among the one ECC block from the 8-16 converter 16 to the buffer memory 18. When at a double-speed, the first correction of the inner code error starts at the time of writing the "15 sectors plus 4 frames" worth of signals among the one ECC block from the 8-16 converter 16 to the buffer memory 18. When at a triple-speed, the first correction of the inner code error starts at the time of writing the "14 sectors plus 194 frames" worth of signals among the one ECC block from the 8-16 converter 16 to the buffer memory 18.

The present invention is not limited to the above embodiments.

For example, in the above embodiment, the correction of the inner code error started in the error correction unit 17 on the ECC block being written to the buffer memory 18 at the timing of "t10" shown in FIG. 5, however, the starting timing is not limited as far as it is between "t10" and "t1" shown in FIG. 5.

As explained above, according to the error correction apparatus of the present invention, the period of time from the start of writing the error correction code block to the memory means to the completion of the error correction can be made shorter.

Also, according to the optical disk reproducing apparatus of the present invention, the access time to the optical disk can be made shorter.

While the invention has been described with reference to specific embodiment chosen for purpose of illustration, it should be apparent that numerous modifications could be made thereto by those skilled in the art without departing from the basic concept and scope of the invention.

What is claimed is:

1. An error correction apparatus which performs an error correction in units of an error correction code block composed of information data, an inner code parity indicating the error correction code for every row of the information data and an outer code parity indicating an error correction code for every column of the information data when a plurality of bit data forming the information data is arranged in matrix, said error correction apparatus comprising:
  a memory means for storing said error correction code block included in a signal read from a memory medium by inputting the error correction code block as units of said row of the information data and the inner code parity corresponding to the row;
  an error correction means for reading the row of said information data and the inner code parity corresponding to the row among the error correction code block stored in said memory means and performing an error correction of the read row of said information data by using the read inner code parity data at the timing before all of the data constituting said error correction code block has been stored in said memory means, in parallel with the operation of storing in said memory means the remaining data constituting the error correction code block, wherein the error correction means is adapted to begin performing the error correction of the read row of said information data when a predetermined amount of data is stored in the memory means, wherein the predetermined amount of data is less than the error correction code block; and
  wherein the error correction means reads said read row of said information data from the memory means.

2. An error correction apparatus as set forth in claim 1, wherein said error correction means terminates the operation of the error correction using the inner code parity on the error correction code block at the timing approximately matching to a timing when all of the data constituting said error correction code block data is stored in said memory means.

3. An error correction apparatus as set forth in claim 1, wherein said correction means starts the operation of the error correction at the timing after a first row of the information data and the inner code parity corresponding to the first row is stored in said memory means.

4. An error correction apparatus as set forth in claim 1, wherein said error correction means writes back the result of the error correction using the inner code parity in the memory means.

5. An error correction apparatus as set forth in claim 4, wherein said error correction means performs the error correction using the result of the error correction using the inner code parity data and the outer code parity data.

6. An error correction apparatus as set forth in claim 1, wherein said memory medium comprises a Digital Versatile Disc (DVD) storing video data and/or audio data.

7. The error correction apparatus as set forth in claim 1, wherein the predetermined amount of data is an amount that causes completion of the error correction by the error correction means and the storing of said error correction code block by the memory means at about a same time.

8. An optical disc reproduction apparatus for reproducing by reading from an optical disc the signal including an inner code parity indicating the error correction code for every row, an outer code parity indicating an error correction code for every column and the error correction code block constituted by information data when a plurality of bit data forming the information data is arranged in matrix, comprising:
  a reading means for reading a signal including said error correction code block from said optical disc;
  a memory means for storing said error correction code block included in the signal read from a memory medium by inputting the same as units of said row of the information data and the inner code parity corresponding to the row;
  an error correction means for read row data of said information data and the inner code parity data corresponding to the row among the error correction code block stored in said memory means and performing an error correction of the read row data of the information data by using the read inner code parity data at the timing before all of the data constituting said error correction code block has been stored in said memory means, in parallel with the operation of storing in said memory means the remaining data constituting the error correction code block, wherein the error correction means is adapted to begin performing the error correction of the read row of said information data when a predetermined amount of data is stored in the memory means, wherein the predetermined amount of data is less than the error correction code block;

a decoding means for decoding the error corrected signal; and wherein the error correction means reads said read row of said information data from the memory means.

9. An optical disc reproduction apparatus as set forth in claim 8, wherein said error correction means terminates the operation of the error correction using the inner code parity on the error correction code block at the timing approximately matching to a timing when all of the data constituting the error correction code block data is stored in said memory means.

10. An optical disc reproduction apparatus as set forth in claim 8, wherein the operation of the error correction is faster than the operation of storing the error correction code block in the memory medium.

11. An optical disc reproduction apparatus as set forth in claim 8, wherein said error correction means writes back the result of the error correction using the inner code parity in the memory means.

12. An optical disc reproduction apparatus as set forth in claim 11, wherein said error correction means performing the error correction using the result of the error correcting using the inner code parity data and the outer code parity data.

13. An optical disc reproduction apparatus as set forth in claim 8, wherein said memory medium comprises a Digital Versatile Disc (DVD) storing video data and /or audio data.

14. The optical disc reproduction apparatus as set forth in claim 8, wherein the predetermined amount of data is an amount that causes completion of the error correction by the error correction means and the storing of said error correction code block by the memory means at about a same time.

* * * * *